United States Patent [19]

Sakakura et al.

[11] Patent Number: 5,679,053
[45] Date of Patent: Oct. 21, 1997

[54] METHOD AND APPARATUS FOR GRINDING A WORKPIECE

[75] Inventors: Moriaki Sakakura; Takayuki Hotta; Satoshi Abeta, all of Aichi-ken, Japan

[73] Assignee: Toyoda Koki Kabushiki Kaisha, Kariya, Japan

[21] Appl. No.: 636,465

[22] Filed: Apr. 23, 1996

[30] Foreign Application Priority Data

Apr. 25, 1995 [JP] Japan ................. 7-099256

[51] Int. Cl.$^6$ .................................................. B24B 49/00
[52] U.S. Cl. ........................ 451/5; 451/10; 451/11; 451/51; 451/246; 451/410
[58] Field of Search .......................... 451/5, 9, 10, 11, 451/51, 57, 58, 242, 246, 407, 410

[56] References Cited

U.S. PATENT DOCUMENTS

| | | | |
|---|---|---|---|
| 4,294,045 | 10/1981 | Enomoto et al. | 451/11 |
| 4,490,946 | 1/1985 | Tsujiuchi et al. | 451/11 |
| 5,076,022 | 12/1991 | Ohta et al. | 451/11 |
| 5,371,975 | 12/1994 | Lundmark | 451/9 |
| 5,562,523 | 10/1996 | Asano et al. | 451/11 |
| 5,562,526 | 10/1996 | Yoneda et al. | 451/11 |
| 5,595,525 | 1/1997 | Hayashi et al. | 451/10 |

*Primary Examiner*—Eileen P. Morgan
*Attorney, Agent, or Firm*—Oblon, Spivak, McClelland, Maier & Neustadt, P.C.

[57] ABSTRACT

In a method and apparatus for grinding a workpiece, a rotating workpiece and a rotating grinding wheel are relatively moved toward and away from each other, and at least first and second grinding steps are performed at high and low infeed rates, respectively. Further, back-off grinding is performed between the first and second grinding steps. A target workpiece diameter to be obtained at the end of the back-off grinding is first provided. During the rough grinding, prediction is repeatedly performed to obtain a workpiece diameter which would be obtained at the end of the back-off grinding if the back-off grinding were started instantaneously. The workpiece diameter is predicted taking account of a delay in the movement of the grinding wheel. The back-off grinding is started when it is judged that the predicted workpiece diameter becomes equal to the target workpiece diameter.

12 Claims, 17 Drawing Sheets

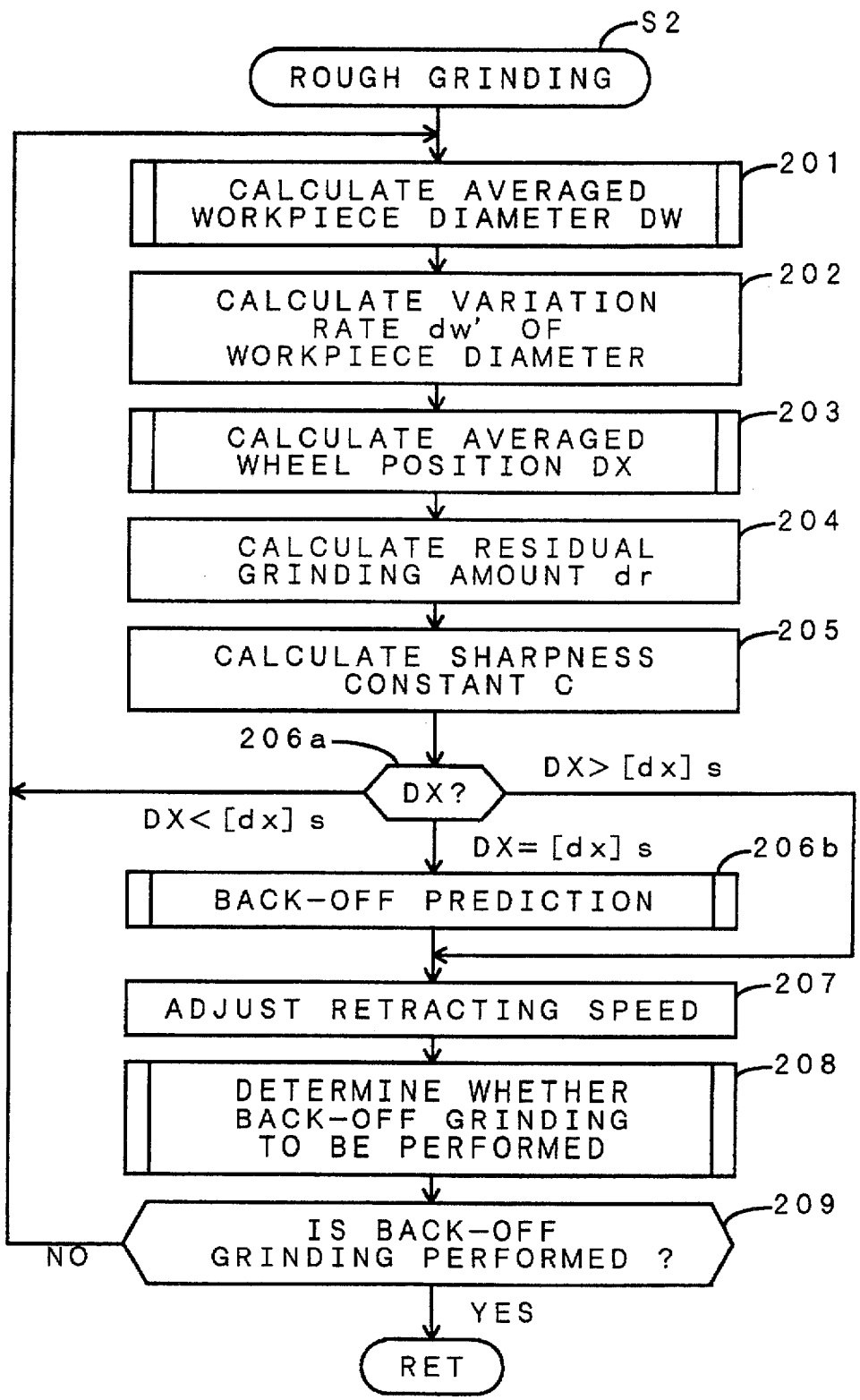

METHOD AND APPARATUS FOR GRINDING A WORKPIECE

BACKGROUND OF THE INVENTION

1. Field of the Invention

The present invention relates to a method and apparatus for grinding a cylindrical workpiece. More particularly, it relates to a method and apparatus in which back-off grinding is performed at a turning point from rough grinding to finish grinding. As to back-off grinding, it is defined as a grinding operation performed while a grinding wheel is being retracted with deflection of the workpiece applying.

2. Discussion of Related Art

In a cylindrical grinding machine, a wheel head carrying a rotating grinding wheel 19 is fed toward a workpiece W supported by centers 15a and 16a attached to a work head and a tailstock, as shown in FIG. 1. In plunge grinding of which operation is to feed the wheel head toward the workpiece W, a grinding pattern shown in FIG. 2 has been proposed in U.S. patent application Ser. No. 08/316,373 filed on Sep. 30, 1994. In this grinding pattern, the diameter of a cylindrical surface Wa (hereinafter referred to as a "workpiece diameter dw") of a workpiece W subjected to grinding is measured by an in-process measuring device 24 during rough grinding GR. And then, when the workpiece diameter dw reaches a predetermined rough grinding finish diameter (dx)r, back-off grinding GB is performed at the surface Wa with the wheel head retracting to a back-off finish position (dx)b. In back-off grinding GB, a grinding allowance left on the surface Wa (hereinafter referred to as a "residual grinding amount"), i.e., the amount of deflection of the workpiece W, is reduced to a value Z which is close to a residual grinding amount after finish grinding GF. As a result of reduction in finish grinding GF for grinding allowance, a grinding cycle time is shortened.

When a grinding operation is performed in accordance with the above-described grinding pattern, the quality (i.e., roundness and surface roughness) and the machining efficiency (i.e., the length of the grinding cycle time) are affected by the timing of the start of back-off grinding GB and the amount of a back-off movement for retracting the wheel head on the basis of back-off grinding GB. In detail, in case a finish allowance ΔD left after back-off grinding GB and the following finish grinding GF is small, the grinding cycle time can be shortened. However, the required roundness and surface roughness cannot be obtained. On the contrary, in case the finish allowance ΔD is large, the quality of the workpiece W can be guaranteed. However, the grinding cycle time is prolonged due to an increase in time ratio for finish grinding GF having a low feed rate with respect to the total grinding time.

Thus, a grinding machine which employs an improved grinding pattern has been proposed to overcome the above-described drawback. As for the grinding pattern, back-off grinding GB is so carried out that it will guarantee the quality (i.e., roundness and surface roughness) of each workpiece W without prolonging the grinding cycle time. Furthermore, the timing of starting back-off grinding GB is determined as follows. Provided back-off grinding GB is started at the current time, a predicted diameter (dw)b of the workpiece W which will reach at the end of back-off grinding GB is immediately being predicted in rough grinding GR. And the prediction is frequently calculated at all times during rough grinding GR. Consequently, instantly the predicted diameter (dw)b corresponds to a target workpiece diameter, back-off grinding GB is actually started.

In detail as shown in FIG. 3, a target workpiece diameter M(dw)b at the end of back-off grinding GB is first calculated on the basis of both a target finish diameter (i.e., a workpiece diameter (dw)f at the end of finish grinding GF) and various machining conditions preset for finish grinding GF. Subsequently, a residual grinding amount (dr)f at the end of finish grinding GF is calculated by taking account of the tool's grinding efficiency (i.e., the sharpness of a grinding wheel), which is also calculated in rough grinding GR. And a target wheel position M(dx)b, which corresponds to a grinding point where the grinding wheel and the workpiece W contact at the end of back-off grinding GB, is so calculated that the residual grinding amount (dr)f at the end of finish grinding GF may be equal to another residual grinding amount (dr)b at the end of back-off grinding GB.

Following the above-described calculation, provided that back-off grinding GB is started at the current time and the wheel head furthermore retracts to the target wheel position (dx)b, the predicted diameter (dw)b which will be obtained at the end of back-off grinding GB is frequently calculated at all times during rough grinding.

When it is judged that the predicted diameter (dw)b becomes equal to the target workpiece diameter M(dw)b, the wheel head starts retracting. Subsequently, when the wheel head is retracted to the target wheel position M(dx)b, the wheel head is fed toward the Workpiece W again in order to perform finish grinding GF until the workpiece diameter dw reaches the target finish diameter (i.e., the workpiece diameter (dw)f at the end of finish grinding).

This grinding pattern has the following drawback. When grinding operation is turned from rough grinding GR to back-off grinding GB, the motion direction of the wheel head is reversed from forward to backward. At this time, the wheel head cannot follow the commanded movement shown as thick continuous line dx but moves with a delay with respect to the commanded movement. This reason is that follow-up delay of the control system and mechanical delay are caused by a motor and a drive force transmitting mechanism for moving the wheel head. Therefore, the diameter of the workpiece W does not completely follow target values shown as thin continuous line dw but actually deviates as illustrated by a thin broken line dwe, so that the diameter of the workpiece W becomes smaller than the target value.

Regardless of the existence of the above-described delay, the predicted diameter (dw)b at the end of back-off grinding GB (i.e., the predicted value) has been calculated in the grinding machine on the basis of the assumption in which the wheel head completely follows the commanded movement shown as thick continuous line dx. Therefore, back-off grinding GB is started in accordance with the predicted value, so that the workpiece diameter at the end of back-off grinding GB becomes (dw)de which is smaller than the target value M(dw)b. Thus, with the result that finish grinding GF is started in a state where the allowance needed to properly perform finish grinding GF is not left, the desired quality (i.e., roundness and surface roughness) cannot be obtained.

SUMMARY OF THE INVENTION

An object of the present invention is to provide an improved method and apparatus for grinding a workpiece in which the timing of starting back-off grinding is properly determined taking the delay in the movement of a wheel head into consideration.

Briefly, in the present invention, a rotating workpiece and a rotating grinding wheel are relatively moved toward and away from each other, and at least first and second grinding steps are performed at high and low infeed rates, respectively. Moreover, back-off grinding is performed between the first and second grinding steps. In the present invention, a target workpiece diameter which will be obtained at the end of back-off grinding is calculated in the rough grinding, and prediction is repeatedly performed so as to obtain a workpiece diameter which would be obtained at the end of back-off grinding if back-off grinding were started instantaneously. The workpiece diameter is predicted taking a delay in the movement of the grinding wheel into consideration. It is judged whether the predicted workpiece diameter at the end of back-off grinding is equal to the target workpiece diameter at the end of back-off grinding. Back-off grinding is started when it is judged that the predicted workpiece diameter at the end of back-off grinding is equal to the target workpiece diameter at the end of back-off grinding.

Preferably, a model which approximates the delay in the movement of the grinding wheel is provided, an amount of reflection of the workpiece is calculated as a residual grinding amount, and the workpiece diameter is predicted on the basis of the residual grinding amount and the model.

Alternatively, the workpiece diameter is predicted on the basis of the position of the grinding head, the measured diameter of the workpiece, and the model.

As described above, in the method and apparatus for grinding a workpiece according to the present invention, the predicted value for the workpiece diameter at the end of back-off grinding is calculated using a model which approximates the delay in the movement of the wheel head. Accordingly, the workpiece diameter at the end of back-off grinding can be accurately predicted so as to start back-off grinding at a proper timing. This provides the effect of guaranteeing the quality (roundness, surface roughness, etc.) of each workpiece and minimizing the cycle time of grinding.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 7 is a sub-flowchart showing rough grinding processing;

DETAILED DESCRIPTION OF THE PREFERRED EMBODIMENT

An embodiment of the present invention will now be described with reference to the drawings.

Figure 1:
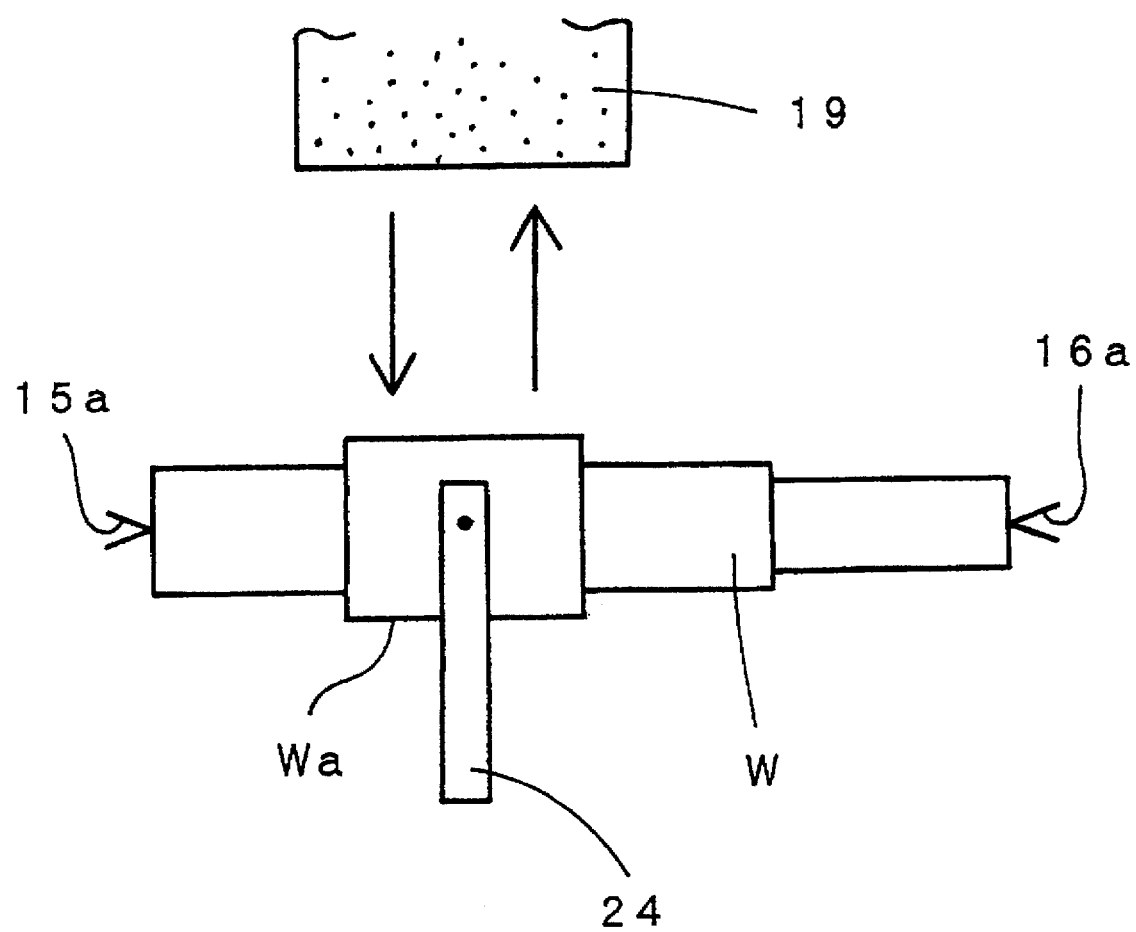
FIG. 1 is a plan view showing a main portion of a grinding machine to which the present invention is applied.
Figure 2:
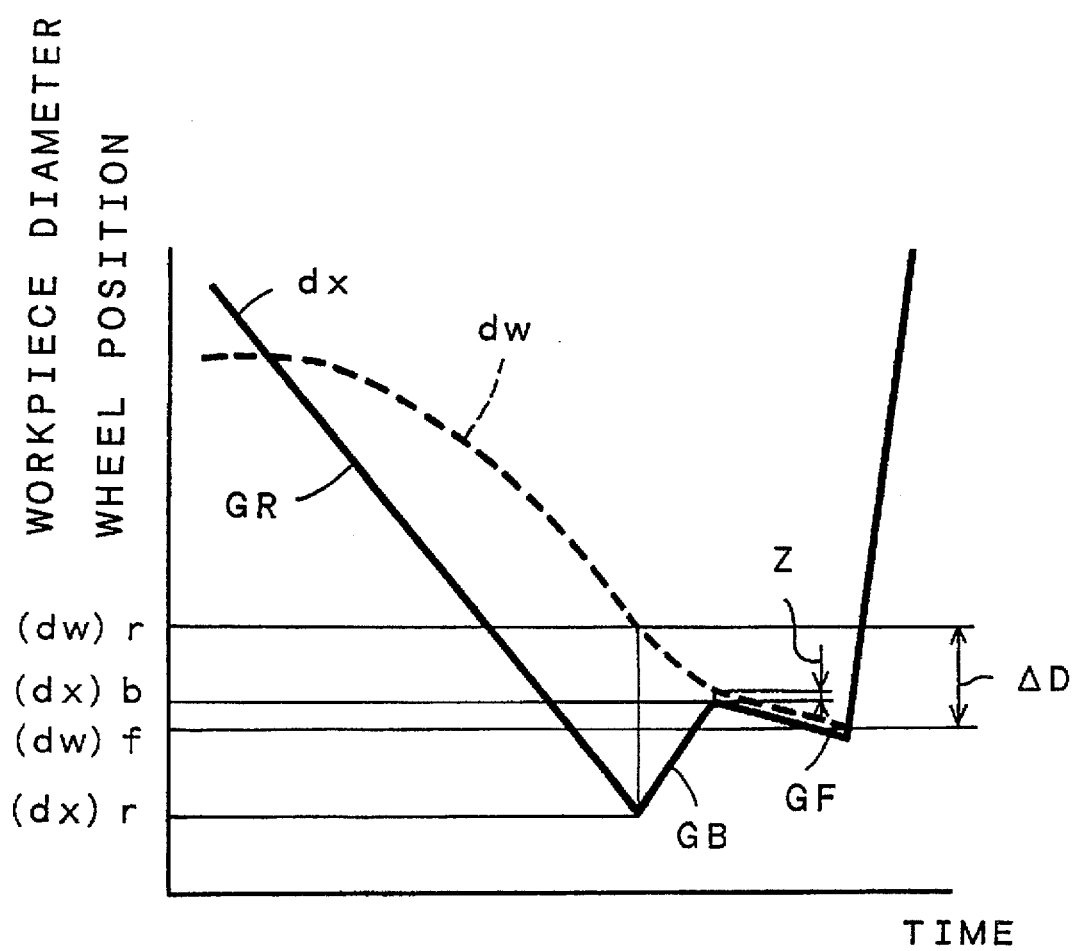
FIG. 2 is an explanatory chart showing an example of a grinding pattern including back-off grinding.
Figure 3:
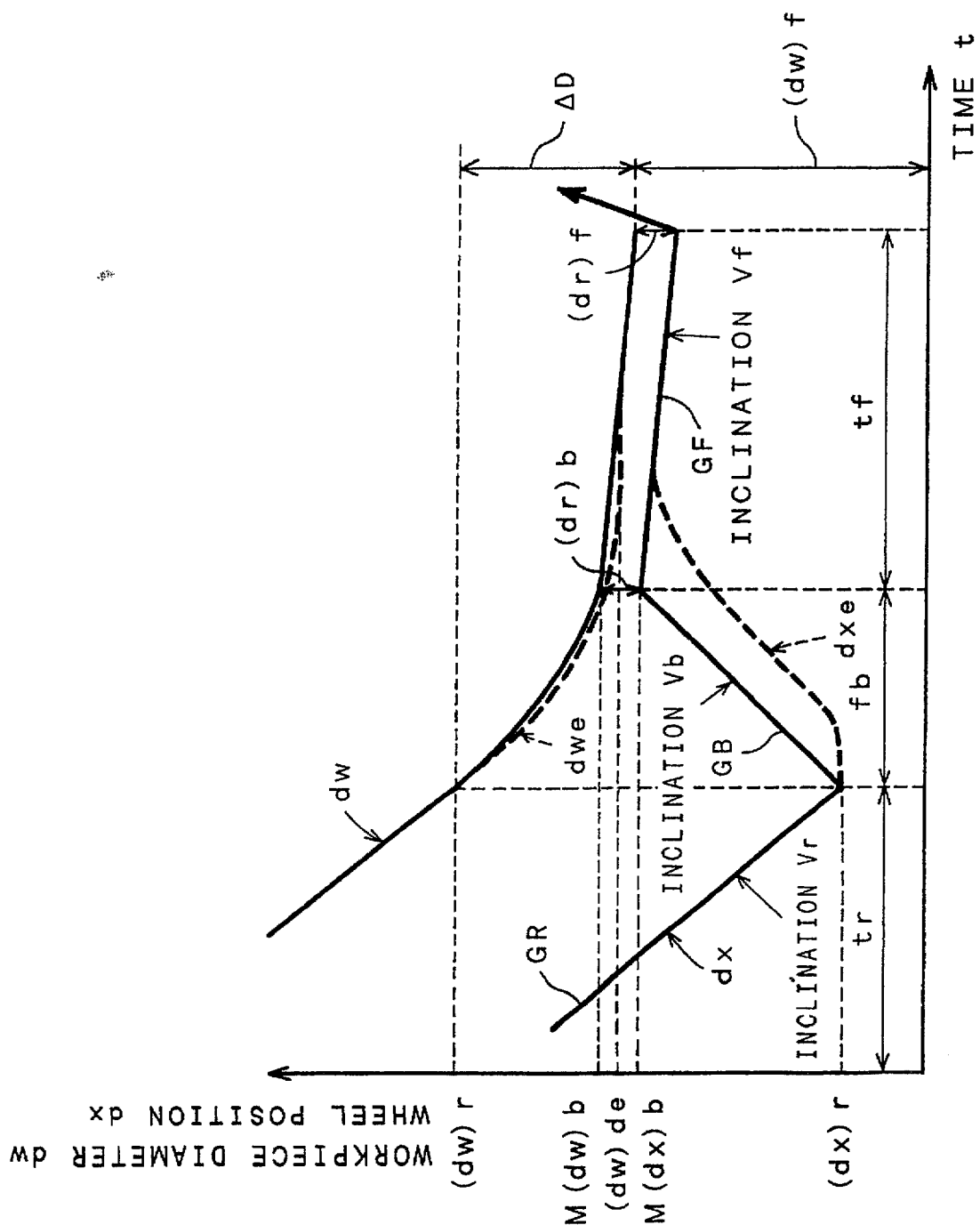
FIG. 3 is an explanatory diagram showing another example of the grinding pattern including back-off grinding.
Figure 4:
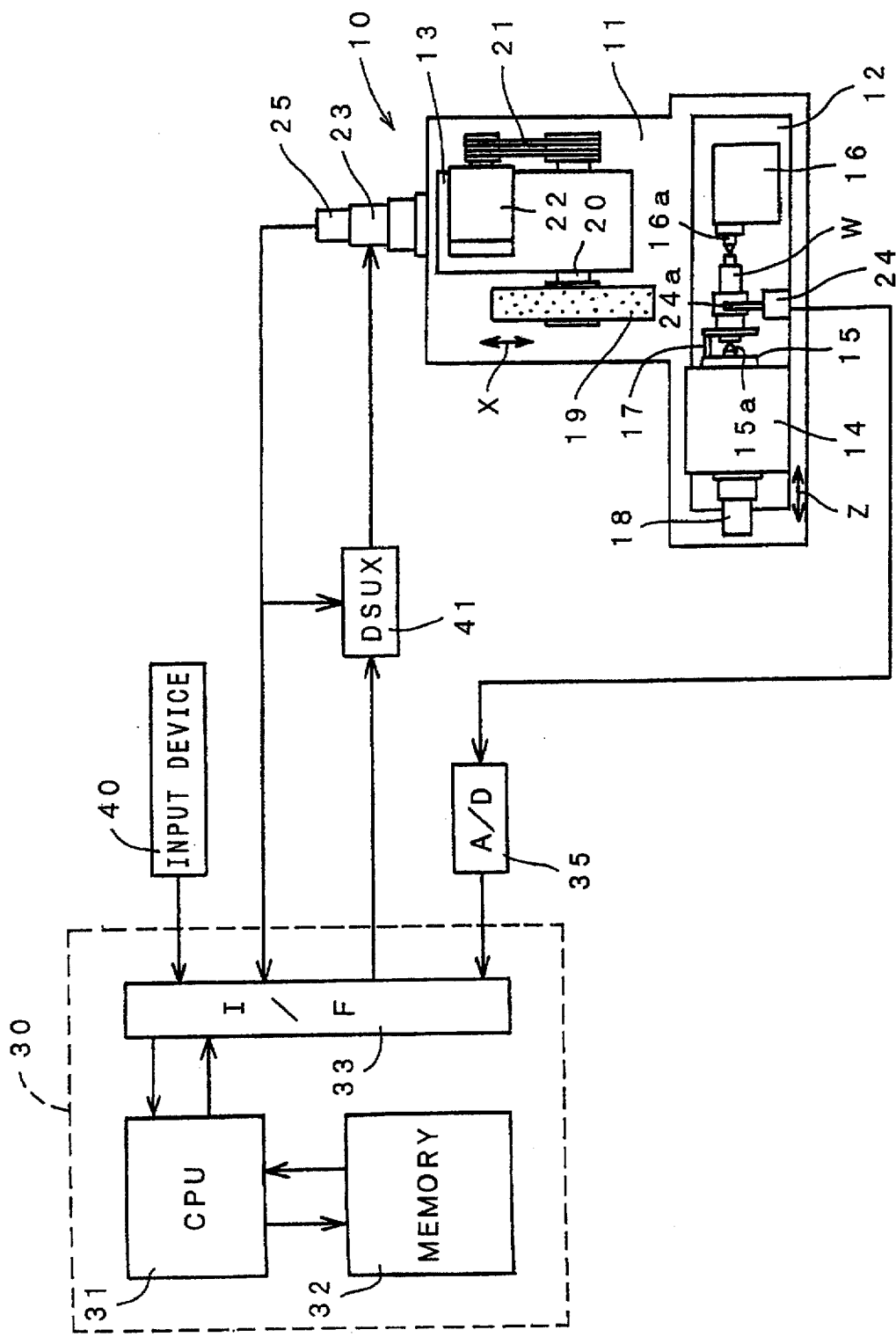
FIG. 4 is a diagram showing the overall structure of a grinding machine according to an embodiment of the present invention.

Referring now to FIG. 4, numeral 10 denotes a grinding machine in which a table 12 is mounted on a bed 11 for movement in a Z-axis direction. A work head 14 rotatably supporting a work spindle 15, and a tailstock 16 are mounted on the table 12 at the right and left ends thereof so that they will face each other. The work spindle 15 is rotated by a motor 18 disposed on the work head 14. A workpiece W is supported by a center 15a provided on the work spindle 15 and a center 16a provided on the tailstock 16 through both ends thereof, and the left end of the workpiece W is engaged with a drive pin 17 projecting from the work spindle 15 for rotation with the work spindle 15.

Further, a wheel head 13 is supported on the bed 11 for movement in an X-axis direction perpendicular to the Z-axis direction. On the wheel head 13, a grinding wheel 19 such as a CBN grinding wheel is supported by a wheel spindle 20 which is driven by a motor 22 via a V-belt transmission mechanism 21. A servomotor 23 provided on the bed 11 is controlled by a digital servo unit 41 which operates in accordance with command signals from a numerical controller 30. The servomotor 23 moves the wheel head 13 in the X-axis direction via an unillustrated ball screw mechanism. A position detector 25 such as an encoder is provided to detect the position of the wheel head 13, i.e., the rotational amount of the servomotor 23. The detected position is input to the digital servo unit 41 for feedback control and is also input to the numerical controller 30 via an unillustrated amplifier.

An in-process measuring device 24 is disposed on the table 12 so that a pair of probes 24a thereof will engage with a cylindrical portion of the workpiece W which is subjected to grinding, in order to continuously and directly measure the outer diameter of that portion. The measurement signal (analog signal) is input to the numerical controller 30.

As shown in FIG. 4, the numerical controller 30 consists of a central processing unit (hereinafter referred to as a "CPU") 31 for controlling and managing the overall operation of the grinding machine, a memory 32, and an interface 33 for exchanging data with external devices.

The digital servo unit 41 and the position detector 25 are connected to the interface 33. When a command signal is supplied from the interface 33 to the digital servo unit 41, the wheel head 13 is moved, and the present position of the wheel head 13 is input to the interface 33. The in-process measuring device 24 is also connected to the interface 33 via an A/D converter 35 so as to input the measured outer diameter of the workpiece W. Further, an input device 40 such as a keyboard for inputting control data and the like is connected to the interface 33.

The memory 32 stores a machining program for machining the workpiece W by properly performing grinding operations including back-off grinding, and various other parameters.

Next, the operation of the grinding machine having the above-described structure will be described in detail with reference to the flowchart shown in FIG. 5 and the explanatory diagrams shown in FIGS. 6A–6C.

Figure 5:
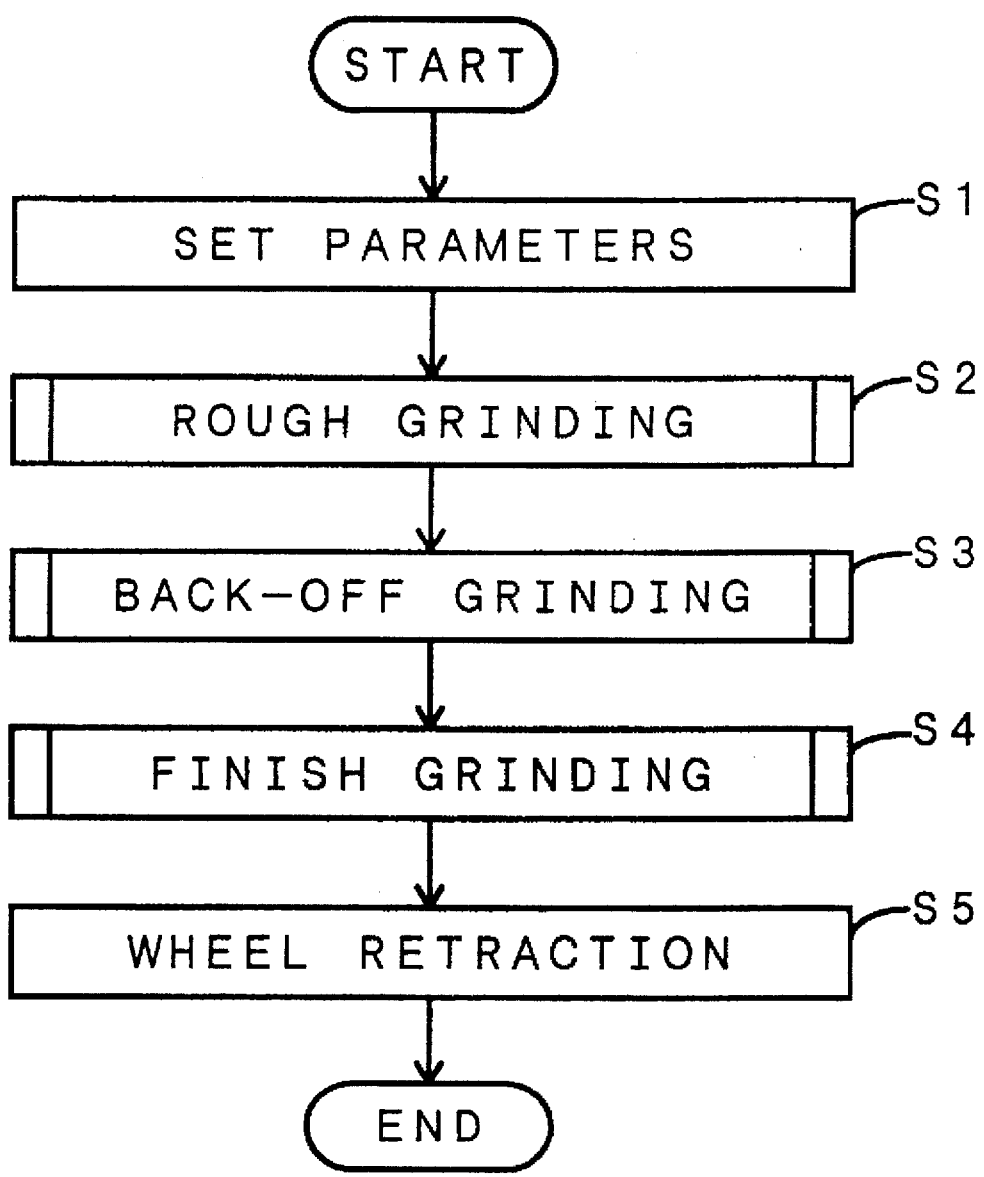
FIG. 5 is a main flowchart showing the operation of the grinding machine shown in FIG. 4.
Figure 6A:
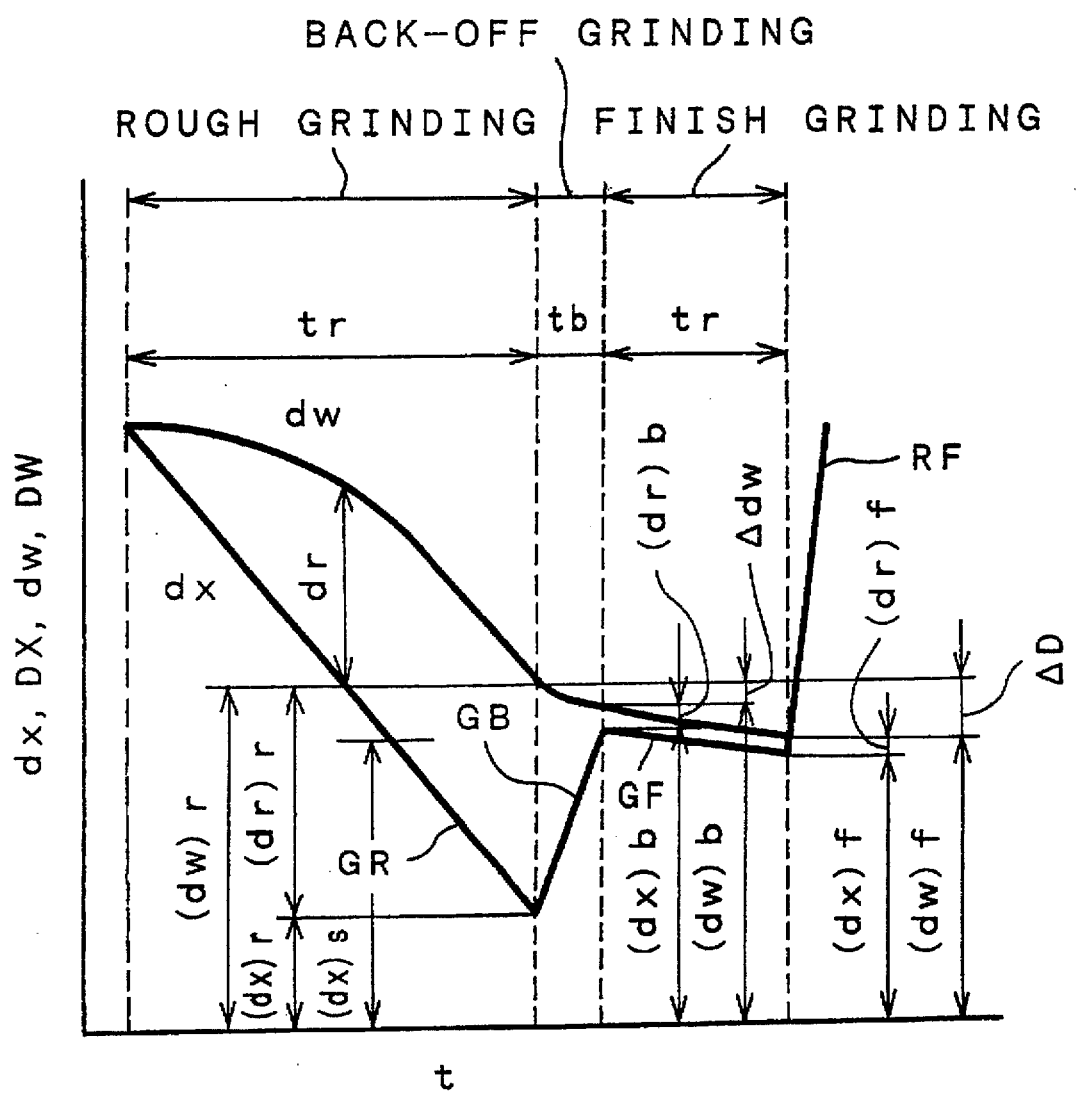
FIGS. 6A–6C are diagrams showing the grinding operation of the grinding machine shown in FIG. 4.
Figure 6B:
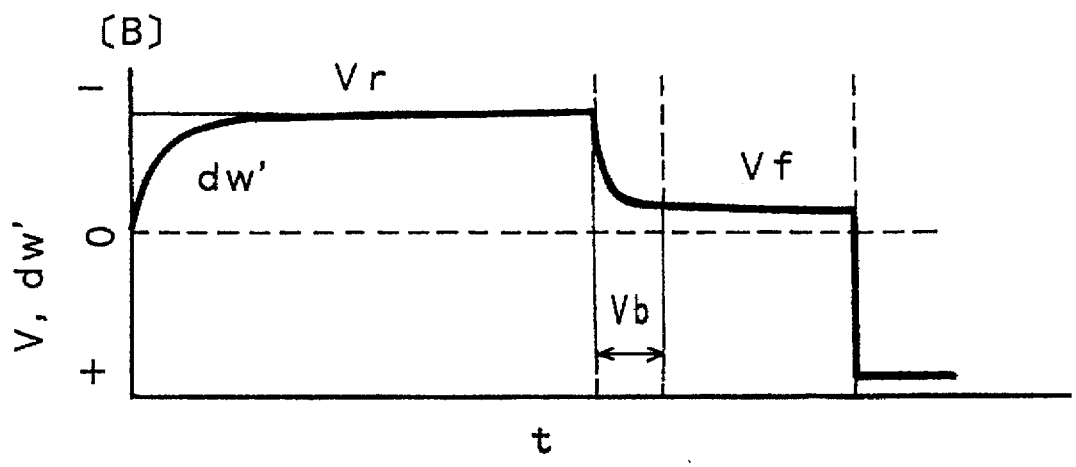
Figure 6C:
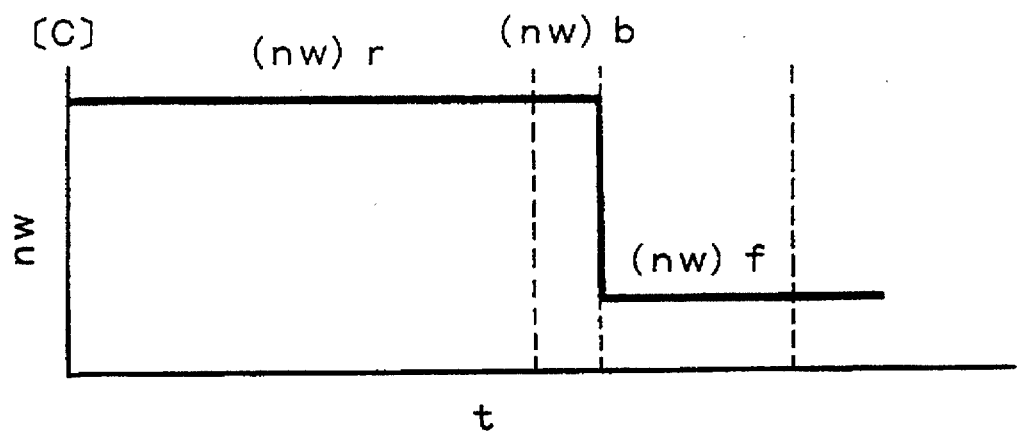

As shown in FIGS. 6A–6C, the grinding operation includes rough grinding GR, back-off grinding GB, and finish grinding GF. The processing shown by the flowchart of FIG. 5 is performed to control the entire grinding operation. FIG. 6A shows variations in the infeed position dx (later described wheel position dx) and in the outer diameter dw of the workpiece W (later described workpiece. diameter dw) with respect to passage of time t. FIG. 6B shows variations in the infeed rate V of the wheel head 13 during the respective grinding steps (i.e., rough grinding GR, back-off grinding GB, and finish grinding GF) and in the variation rate dw' of the workpiece diameter with respect to passage of time. FIG. 6C is a graph showing the rotational speed nw during the respective grinding steps GR, GB and GF.

As shown in FIG. 5, various parameters are set in step S1 before processing for the grinding operation is performed. The parameters to be set include a rotational speed (nw)r of the workpiece W in rough grinding GR (hereinafter referred to as a "workpiece rotational speed for rough grinding"), a rotational speed (nw)b of the workpiece W in back-off grinding GB (hereinafter referred to as a "workpiece rotational speed for back-off grinding"), a rotational speed (nw)f of the workpiece W in finish grinding GF (hereinafter referred to as a "workpiece rotational speed for finish grinding"), a target rotational amount Nb of the workpiece W in back-off grinding GB (hereinafter referred to as a "workpiece rotational amount for back-off grinding"), a target rotational amount Nf of the workpiece W in finish grinding GF (hereinafter referred to as a "workpiece rotational amount for finish grinding"), an infeed rate Vr of the wheel head 13 in rough grinding GR (hereinafter referred to as a "wheel infeed rate for rough grinding"), an infeed rate Vf of the wheel head 13 in finish grinding GF (hereinafter referred to as a "wheel infeed rate for finish grinding"), a finish diameter (dw)f of the workpiece W (hereinafter referred to as a "workpiece diameter after finish grinding"), a grinding time tf for the finish grinding GF (hereinafter referred to as a "finish grinding time"), and a wheel position (dx)s at the time when the later described back-off prediction processing is performed (hereinafter referred to as a "prediction processing executing wheel position") (see FIGS. 6A–6C).

In the grinding operation of the present embodiment, grinding is performed so as to satisfy the following three requirements, thereby guaranteeing the quality (roundness and surface roughness) while making the grinding cycle time the shortest.

[Requirement 1] The workpiece W must rotate at least one turn in back-off grinding GB, and rotate at least one turn in finish grinding GF.

[Requirement 2] A stepped portion in the circumferential direction of the workpiece W left at the end of rough grinding must be removed in back-off grinding GB.

[Requirement 3] The residual grinding amount (dr)b at the end of back-off grinding must be equal to the residual grinding amount (dr)f at the end of finish grinding.

Among the above-described parameters, the workpiece rotational amount Nb for back-off grinding and the workpiece rotational amount Nf for finish grinding are determined on the basis of Requirement 1 so that they will be Nb=1 and Nf=1. However, since the rotational amounts of the workpiece W in Requirement 1 are values which make the grinding cycle time the shortest, the rotational amounts Nb and Nf may be changed arbitrarily. When the quality of the workpiece W is important in an actual machining, the workpiece rotational amount Nf for finish grinding is changed to about 2 to 3.

The finish grinding time tf is determined by the following equation:

$$tf = \frac{Nf}{(nw)f} \quad (1)$$

As the prediction processing executing wheel position (dx)s, a position of the wheel head is set so as to leave a grinding allowance capable of manually grinding on the workpiece, in case it is determined by the later described back-off prediction processing 206b that back-off grinding GB cannot be performed.

When a command for starting the machining is outputted from the input device 40 after the setting of the parameters in step S1 has been completed, the CPU 31 successively performs the steps S2–S5. At this time, the infeed position dx (hereinafter referred to as a "wheel position dx") is detected by the position detector 25 while the outer diameter dw of a cylindrical surface Wa of the workpiece W to be ground (hereinafter referred to as a "workpiece diameter dw") is detected by the in-process measuring device 24. The wheel position dx and the workpiece diameter dw are input to the controller 30 at sampling intervals of $\Delta t$.

When the processing moves to step S2, the CPU 31 causes the grinding wheel 19 to rotate, and causes the motor 18 to rotate the workpiece W supported by the work head 14 and the tailstock 16 at the workpiece rotational speed (nw)r for rough grinding. The wheel head 13 is then advanced at the infeed rate Vr for rough grinding (see the continuous line GR in FIG. 6A) so as to start rough grinding GR of the workpiece W. Simultaneously with this, the rough grinding processing shown in FIG. 7 is performed. It is to be noted that the respective steps of each program performed in steps S2–S4 for the grinding operation, which will be described later, are performed at sampling intervals of $\Delta t$.

In step 201, an averaged workpiece diameter DW is calculated. This averaged workpiece diameter DW is obtained by compensating the workpiece diameter dw measured by the in-process measuring device 24 so as to remove periodic variations due to torque fluctuation and variations due to noise. The technique for calculating the averaged workpiece diameter DW is described in Japanese Patent Application No. 6-234978. The averaged workpiece diameter DW thus calculated represents an instantaneous workpiece diameter DW in the following description. The averaged workpiece diameter DW is stored in an unillustrated buffer of the memory 32. In the present embodiment, the buffer is always updated, so that a predetermined number of newest values of the averaged workpiece diameter DW are stored in the buffer.

When the processing moves to step 202, the variation rate dW' of the workpiece diameter is calculated from the averaged workpiece diameter DW in accordance with the following equation:

$$dw'(t) = \frac{DW(t) - DW(t - \Delta t)}{\Delta t} \quad (2)$$

wherein DW(t) is an averaged workpiece diameter at a time t, and dw'(t) is a variation rate of the workpiece diameter at the time t.

The variation rate dw'(t) of the workpiece diameter is calculated by dividing, by the sampling interval Δt, the difference between the current workpiece diameter DW(t) and the workpiece diameter DW(t−Δt) sampled in the previous cycle and stored in the unillustrated buffer of the memory 32. The variation rate dw'(t) represents the speed of the variation of the workpiece diameter DW.

In step 203, an averaged wheel position DX is calculated. This averaged wheel position DX is obtained by compensating the wheel position dx measured by the position detector 25 so as to remove periodic variations due to torque fluctuation and variations due to noise. The averaged wheel position DX is calculated in a manner similar to that for calculating the averaged workpiece diameter DW. The averaged wheel position DX thus calculated represents an instantaneous wheel position DX in the following description.

When the processing moves to step 204, the residual grinding amount dr corresponding to the amount of deflection of the workpiece W is calculated, as the difference between the workpiece diameter DW and the wheel position DX, by the following equation:

$$dr(t) = DW(t) - DX(t) \quad (3)$$

In step 205, using the variation rate dw' of the workpiece diameter calculated in step 202 and the residual grinding amount dr calculated in step 204, a sharpness constant C representing the sharpness of the grinding wheel 19 is calculated by the following equation:

$$C = \frac{dw'(t)}{dr(t)} \quad (4)$$

In subsequent step 206a, the wheel position DX is compared with the prediction processing executing wheel position (dx)s so as to judge whether the back-off prediction processing is to be performed. Until the wheel head 13 reaches the prediction processing executing wheel position (dx)s (during a period in which the inequality DX>(dx)s is satisfied), the processing from step 201 to step 205 is repeated. When the wheel head 13 has reached the prediction processing executing wheel position (dx)s (when the equality DX=(dx)s is satisfied), the back-off prediction processing is performed in step 206b. Since the workpiece diameter DX is a discrete value, the wheel head 13 is judged to have reached the prediction processing executing wheel position (dx)s when the wheel position DX enters a predetermined range extending from the prediction processing executing wheel position (dx)s. After the step 206b, the processing from step 207 to step 209 is performed. When the wheel head 13 has passed through the prediction processing executing wheel position (dx)s (when the inequality DX<(dx)s is satisfied), the processing moves to step 207. With the above-described processing, the back-off prediction processing 206b is executed only once in each grinding operation.

When the processing moves to step 206b, the back-off prediction processing is performed. In this back-off prediction processing, a maximum retracting speed Vb which satisfies all the above-described Requirements 1, 2 and 3 is obtained on the basis of the workpiece diameter DW when the wheel head 13 has reached the prediction processing executing wheel position (dx)s (when the equality DX=(dx)s is satisfied). When the maximum retracting speed. Vb which satisfies all the above-described Requirements 1, 2 and 3 cannot be obtained, it is judged that back-off grinding (the continuous line GB in FIG. 6A) cannot be performed.

The back-off prediction processing (step 206b) will be described in more detail with reference to the flowchart of FIG. 8 and the explanatory charts of FIGS. 9 and 10.

In step 242, the period of time (tb)min=1/(nw) in which the workpiece W rotates one turn is compared with a preset upper limit (tb)max regarding the retracting the in back-off grinding.

Next, a description will be made of the wheel retracting speed Vb in back-off grinding. A state is assumed in which the grinding operation is constantly performed during rough grinding (the continuous line GR in FIG. 6A), i.e., the variation in the workpiece diameter dw (the variation rate dw' of the workpiece diameter) and the variation in the wheel position dx (the inclination of the line indicating the wheel position dx) are the same and both the variations are constant. In such a state, the residual grinding amount dr and the variation rate dw' of the workpiece diameter satisfy the following equation:

$$dw'(t) = C \cdot dr(t) \quad (5)$$

On the Basis of the equation (5), the relationship between the wheel retracting speed Vb in back-off grinding and the back-off grinding time tb can be obtained as follows:

$$Vb = \frac{Vr}{1 - \exp(-C \cdot tb)} \quad (6)$$

wherein Vr is the wheel infeed rate in rough grinding. The graph of FIG. 9 shows the relationship thus obtained.

To shorten the overall cycle time of grinding, it is preferred to increase the wheel retracting speed Vb in back-off grinding, thereby shortening the back-off grinding time tb. However, due to Requirement 1, the workpiece W must be rotated at least one turn. This period of time (tb)min required to rotate the workpiece W one turn in back-off grinding is expressed by the equation (tb)min=1/(nw)b (hereinafter called as a "lower limit value (tb)min of the back-off grinding time"). In some cases, the wheel retracting speed Vb in back-off grinding must be decreased due to other grinding conditions. However, if the back-off grinding time tb excessively increases, it becomes impossible to realize the feature of the present invention, i.e., shortening the cycle time of grinding. Therefore, an upper limit (tb)max is provided regarding the back-off grinding time. In addition, the wheel retracting speed Vb must be lower than a maximum value determined by the performance of the grinding machine 10, i.e., must be lower than a maximum speed (Vb)max at which the wheel head 13 can be retracted.

As described above, a range (the area BVb in FIG. 9) in which the back-off grinding time tb can be varied is determined in step 242. That is, when the lower limit (tb)min of the back-off grinding time exceeds the upper limit (tb)max of the back-off grinding time, the range (area BVb) in which the back-off grinding time tb can be determined does not exist. In this case, it is judged that the workpiece rotational speed (nw)b for back-off grinding is too slow and that the wheel head 13 therefore cannot be retracted, and the processing moves to step 246. In step 246, the wheel head 13 is retracted at a rapid speed, and the grinding operation is stopped.

When the lower limit (tb)min of the back-off grinding time does not exceed the upper limit (tb)max of the back-off grinding time, i.e., when the range (area BVb) in which the back-off grinding time tb can be determined exists, the processing moves to step 243 so as to judge whether it is possible to remove a stepped portion of the workpiece W in the circumferential direction thereof which would be left after rough grinding (which corresponds to the amount of decrease in the workpiece diameter per rotation of the workpiece in rough grinding, i.e., dw'(t)/(nw)r).

Also, Requirement 2 must be satisfied so as to guarantee the quality (especially roundness) of the workpiece W after the grinding operation. Therefore, the amount of decrease in the workpiece diameter in back-off grinding must be larger than a step amount Δdw of the stepped portion of workpiece W which would be left after rough grinding, i.e., at the beginning of back-off grinding. When rough grinding is performed in the above-described steady state (dw'=Vr/60), there is the following relationship:

$$\Delta dw \geq -\frac{Vr}{(nw)r} \quad (7)$$

wherein (nw)r is the workpiece rotational speed in rough grinding.

From the equations (5) and (7), the following equation can be obtained:

$$\frac{C \cdot tb}{1 - \exp(-C \cdot tb)} \leq 1 + \frac{60 \cdot C}{(nw)r} \quad (8)$$

The left side of the equation (8) is a function of the back-off grinding time tb. When the left side is expressed as F(tb), it varies as shown in FIG. 10 as the back-off grinding time tb varies.

Figure 10:
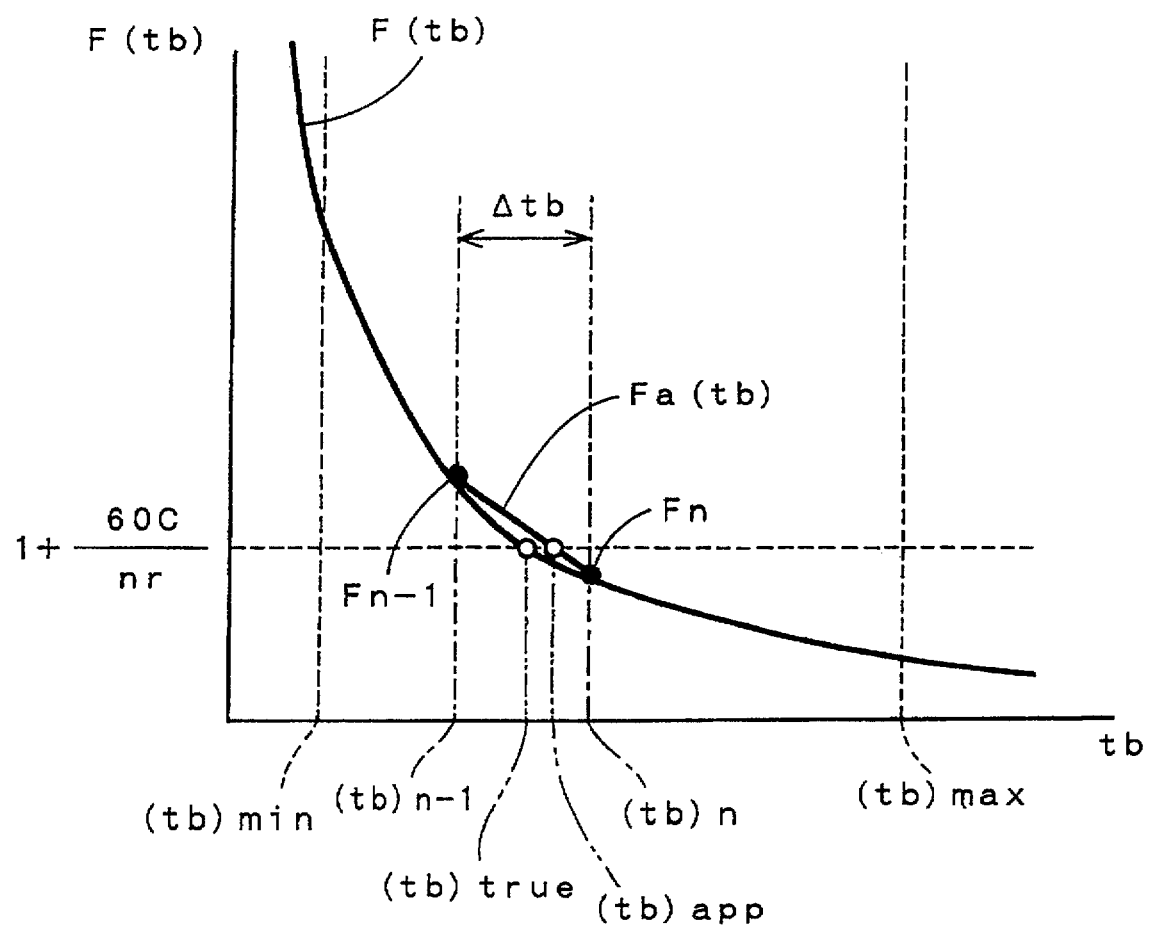
FIG. 10 is a graph showing the relationship between a function F(tb) and the length of time of back-off grinding.

A shortest back-off grinding time tb which satisfies the above described requirements is used as the back-off grinding time tb ((tb)true in FIG. 10). That is, in step 243, by comparing the value of F((tb)max) for the upper limit (tb)max of the grinding time with the value of (1+60·C/nr), it is judged whether back-off grinding at a wheel retracting speed Vb is completed within the above-described range of the back-off grinding time. When there exists the wheel retracting speed Vb in back-off grinding (namely, when F((tb)max)≤1+60·C/nr), the processing moves to step 244. When no wheel retracting speed exists for back-off grinding (when F((tb)max)<1+60·C/nr), it is decided that the stepped portion of the workpiece W in the circumferential direction thereof left after rough grinding cannot be removed. In this case, the processing moves to step 246 in which the wheel head 13 is retracted at a rapid speed so as to stop the grinding operation.

When the wheel retracting speed Vb in back-off grinding exists, the processing moves to step 244 in which a minimum back-off grinding time (hereinafter referred to as a "shortest back-off grinding time Mtb") is calculated within the above-described range. The manner of calculating the shortest back-off grinding time Mtb will be described with reference to FIG. 10. As described above, the shortest back-off grinding time Mtb is a smallest value ((tb)true in FIG. 10) which is determined within the range of the back-off grinding time (from the lower limit (tb)min to the upper limit (tb)max) so that the value of the function F(tb) will not exceeds 1+60·C/nr. However, since the function F(tb)=1+60·C/nr cannot be analytically solved, an approximate solution (tb)app is obtained as follows.

That is, the back-off grinding time tb is stepwise increased from the lower limit (tb)min at time intervals of Δtb, and the value of the function F(tb) is calculated and stored. The value Fn calculated when the inequality F(tb)<1+60·C/nr is first satisfied (value for a back-off grinding time (tb)n) and the value Fn−1 obtained in the previous calculation (value for a back-off grinding time (tb)n−1) are used to obtain a line Fa(tb) for linear interpolation. A back-off grinding time tb which satisfies the equality Fa(tb)=1+60·C/nr is calculated as an approximate value (tb)app. This approximate value (tb)app is used as the shortest back-off grinding time Mtb.

In subsequent step 245, the wheel retracting speed Vb is calculated by the following equation using the shortest back-off grinding time Mtb calculated in step 244:

$$Vb = \frac{Vr}{1 - \exp(-C \cdot Mtb)} \quad (9)$$

With the above-described calculation, the back-off prediction processing (step 206b) is completed. When it is judged that back-off grinding cannot be performed, the wheel head 13 is retracted at a rapid speed, and the grinding operation is stopped. When it is judged that back-off grinding can be performed, a highest wheel retracting speed Vb in back-off grinding which satisfies the above-described various requirements is obtained, and the processing moves to step 207 of FIG. 7.

In step 207, processing for adjusting the retracting speed is performed. That is, the wheel retracting speed Vb in back-off grinding obtained in step 206b is compensated on the basis of the result of comparison between the wheel infeed rate Vr and the variation rate dw' of the workpiece diameter calculated in step 202. That is, a compensated wheel retracting speed Vb' can be calculated by the following equation:

$$Vb' = Vb \cdot \frac{dw'}{Vr} \quad (10)$$

This calculation is performed on the assumption that the above-described wheel retracting speed Vb (the processing from step 242 to step 245 in FIG. 8) is calculated in a steady state, i.e., the wheel infeed rate Vr for rough grinding is equal to the variation speed of the workpiece diameter dw (the variation rate dw' of the workpiece diameter). However, actual grinding includes a transitional state, i.e., a state in which the wheel infeed rate Vr for rough grinding becomes larger than the variation rate dw' of the workpiece diameter. Therefore, if back-off grinding is performed at the wheel retracting speed Vb calculated during such a transitional period, the infeed becomes excessive, thereby producing a defective product. To overcome this problem, the compensated wheel retracting speed Vb' obtained by the equation (10) is used as the wheel retracting speed Vb for performing the back-off grinding process (step S3 in FIG. 5), which will be described later.

Next, the processing moves to step 208 shown in FIG. 7 so as to perform the processing for judging whether back-off grinding is to be performed. In this processing, it is judged, using the workpiece diameter dw which is measured at intervals of Δt in rough grinding, whether back-off grinding GB is to be started. This processing will be described in detail with reference to the flowchart of FIG. 11.

In this processing, it is judged to start back-off grinding GB when all the above-described Requirements 1–3 are satisfied.

In step 251, a target workpiece diameter M(dw)b to be obtained at the end of back-off grinding is calculated by the following equation using the wheel infeed rate Vf for finish grinding, the finish grinding time tf and the workpiece diameter (dw)f at the end of finish grinding, which have been set in step S1 of FIG. 5:

$$M(dw)b = (dw)f + Vf \cdot tf \quad (11)$$

In next step 252, a target wheel position M(dx)b to be reached by the wheel head at the end of back-off grinding is calculated by the following equation using the wheel infeed rate Vf for finish grinding set in step S1, the sharpness constant C calculated in step 205 of FIG. 7, and the target workpiece diameter M(dw) at the end of back-off off grinding calculated in step 251:

$$M(dx)b = M(dw)b - \frac{Vf}{C} \quad (12)$$
$$= M(dw)b - (dr)f$$

In this equation, the target wheel position M(dx)b of back-off grinding is calculated on the basis of the facts that the result of the division (the wheel infeed rate Vf for finishing grinding/the sharpness constant C) corresponds to the residual grinding amount (dr)f at the end of finish grinding, and that the residual grinding amount (dr)f at the end of finish grinding is equal to the residual grinding amount at the end of back-off grinding due to Requirement 3.

In subsequent step 235, calculation is performed using the following equation to obtain a period of time tb (back-off grinding time) which is required to retract the wheel head, at the wheel retracting speed calculated in step 207 of FIG. 7, to the target wheel position M(dx)b of back-off grinding calculated in step 252:

$$tb = \frac{M(dx)b - DX}{Vb} \quad (13)$$

After moving to step 254, the back-off grinding time tb calculated in step 253 is compared with the time needed to rotate the workpiece one turn in back-off grinding (1/(nw)b). In detail, it is judged whether or not the workpiece rotates one or more turns in back-off grinding (i.e., whether Requirement 1 is satisfied). When the back-off grinding time tb is equal to or longer than the time needed to rotate the workpiece one turn in back-off grinding (tb≦1/(nw)b), it is judged that the workpiece rotates one or more turns in back-off grinding, and the processing moves to step 255. When the back-off grinding time tb is shorter than the time needed to rotate the workpiece one turn in back-off grinding (tb<1/(nw)b), it is judged that the workpiece does not rotate one turn in back-off grinding, and the processing moves to step 262, in which a retraction flag is set to an OFF state. The retraction flag is used to judge whether back-off grinding is to be performed in step 262. After that, the processing moves to step 209 of FIG. 7.

In step 255, a workpiece diameter S(dw)b is predicted by the following equation on the assumption that the wheel head 13 is retracted at the wheel retracting speed Vb calculated in step 207 of FIG. 7:

$$S(dw)b = \left( dr - \frac{Vb}{C} \right) \exp(C \cdot tb) + \frac{Vb}{C} + M(dx)b - dw' \cdot Ta \quad (14)$$

wherein Ta is a delay time.

In the equation (14), calculation is performed taking account of the fact that the wheel head 13 actually moves with a delay with respect to command values for moving the wheel head 13 due to the follow-up delay of the control system and the mechanical delay. That is, when command values for moving the wheel head 13 is given as indicated by a thin continuous line dx in FIG. 12, the wheel head 13 actually moves as indicated by a thick continuous line dxe. Therefore, in the present embodiment, the actual movement of the wheel head 13 (thick continuous line dxe) is approximated by a model in which the movement of the wheel head 13 is approximated by delaying the commanded movement by the delay time Ta (broken line dxm). Using this model, the workpiece diameter S(dw)b (prediction value) is calculated. The delay time Ta is a preset value, and it is preferred to use, as the delay time Ta, the delay in the movement of the wheel head 13 which is actually measured for a certain command value.

In step 257, it is judged whether the following inequality is satisfied, in which the workpiece diameter S(dw)b at the end of back-off grinding calculated by the equation (14) is used:

$$DW - S(dw)b \geq \frac{dw'}{(nw)r} \quad (15)$$

This inequality is used in step 257 so as to determine whether a stepped portion of the workpiece in the circumferential direction thereof left after rough grinding can be removed by back-off grinding (i.e., whether Requirement 2 is satisfied). That is, the result of the subtraction (the current workpiece diameter DW—the workpiece diameter S(dw)b at the end of back-off grinding) is compared with the result of the division (dw'/(nw)r). When it is judged that the stepped portion of the workpiece in the circumferential direction thereof left after rough grinding can be removed by back-off grinding, the processing moves to step 258. When it is judged that the stepped portion of the workpiece cannot be removed by back-off grinding, the processing moves to step 262 so as to set the back-off flag to an OFF state. After that, the processing moves to step 209 of FIG. 7.

In step 258, the difference de between the workpiece diameter S(dw)b at the end of back-off grinding S(dw)b and the target workpiece diameter M(dw)b of the back-off grinding calculated in step 251 is calculated by the following equation:

$$de = S(dw)b - M(dw)b \quad (16)$$

In step 259, the difference de calculated in step 258 is stored in an unillustrated buffer in the memory 32. In the following description, the difference de calculated at a time t is referred to as the "difference de(t)".

In step 260, it is judged whether the sign of the current difference de(t) calculated in step 258 is the same as that of the difference de(t−Δt) calculated at a time prior to the current time by the sampling interval Δt. This judgment is performed so as to determine whether the workpiece diameter S(dw)b at the end of back-off grinding S(dw)b has reached the target workpiece diameter M(dw)b, i.e., whether Requirement 3 is satisfied.

When it is judged in Step 260 that the workpiece diameter S(dw)b at the end of back-off grinding S(dw)b has reached the target workpiece diameter M(dw)b (de(t)·de(t−Δt)<0), the processing moves to step 261 so as to set the back-off flag to an ON state. After that, the processing moves to step 209 of FIG. 7. When it is judged in step 260 that the workpiece diameter S(dw)b at the end of back-off grinding S(dw)b has not reached the target workpiece diameter M(dw)b (de(t)·de(t−Δt)>0), the processing moves to step 262 so as to set the back-off flag to an OFF state. After that, the processing moves to step 209 of FIG. 7.

In step 209 of FIG. 7, it is judged whether back-off grinding is to be performed. This judgment is made on the basis of the state of the back-off flag (i.e., whether the back-off flag is ON or OFF). When back-off grinding is to be performed (when the back-off flag is ON), the processing moves to step S3 of FIG. 5. When it is judged that back-off grinding is not to be performed (when the back-off flag is OFF), the processing moves back to step 201 so as to repeat the steps 201 to 209. The rough grinding processing (step S2 in FIG. 5) is completed by the above-described operation, and the processing then moves to step S3 of FIG. 5.

Figure 13:
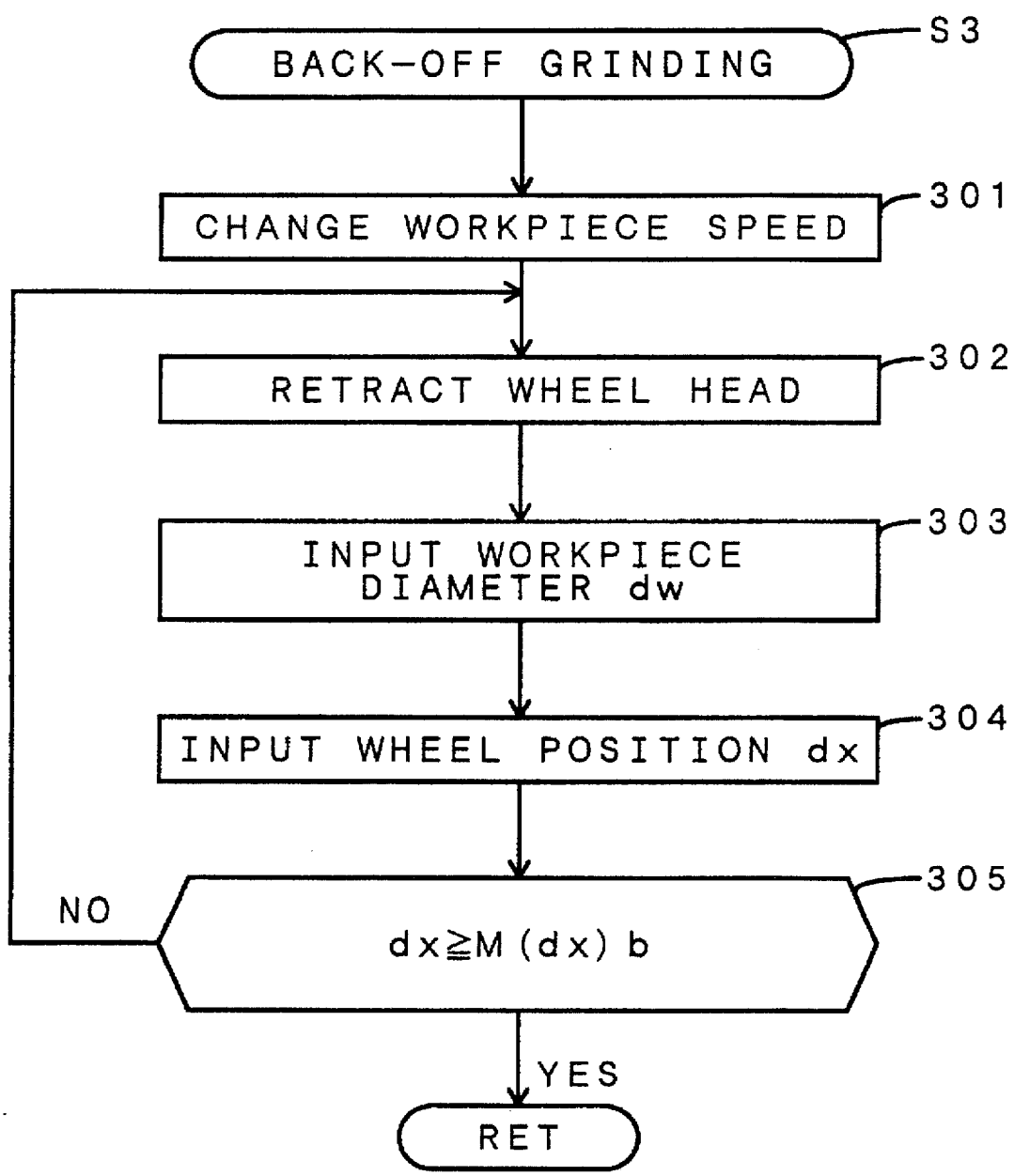
FIG. 13 is a sub-flowchart showing back-off grinding processing.

In step S3, the back-off grinding processing is performed. This back-off grinding processing will be described with reference to the flowchart shown in FIG. 13.

In step 301, the rotational speed of the workpiece W is changed to the rotational speed (nw)b for back-off grinding. In the present embodiment, the rotational speed (nw)r is equal to the rotational speed (nw)b for back-off grinding.

Figure 8:
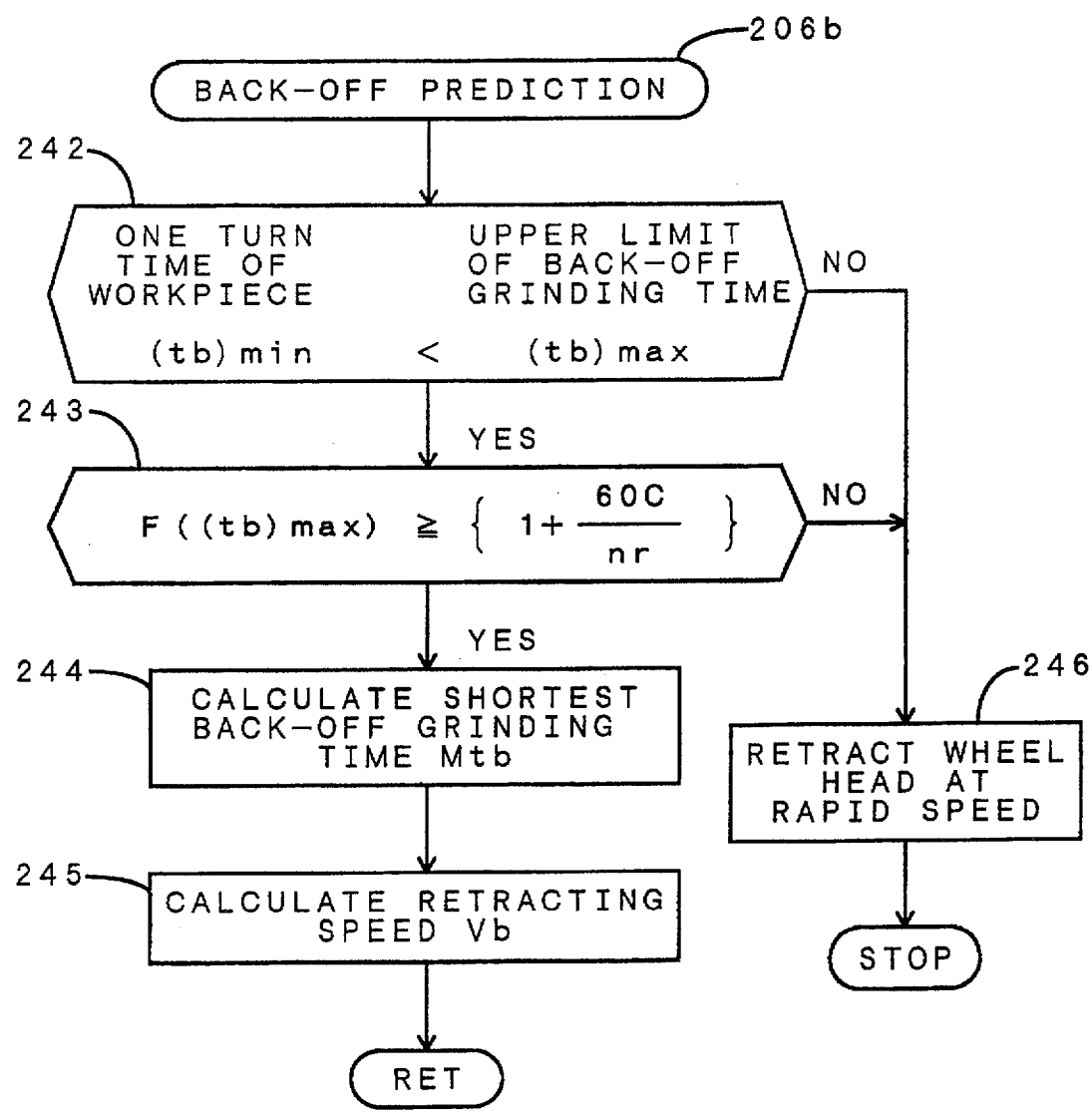
FIG. 8 is a sub-flowchart showing back-off prediction processing.
Figure 9:
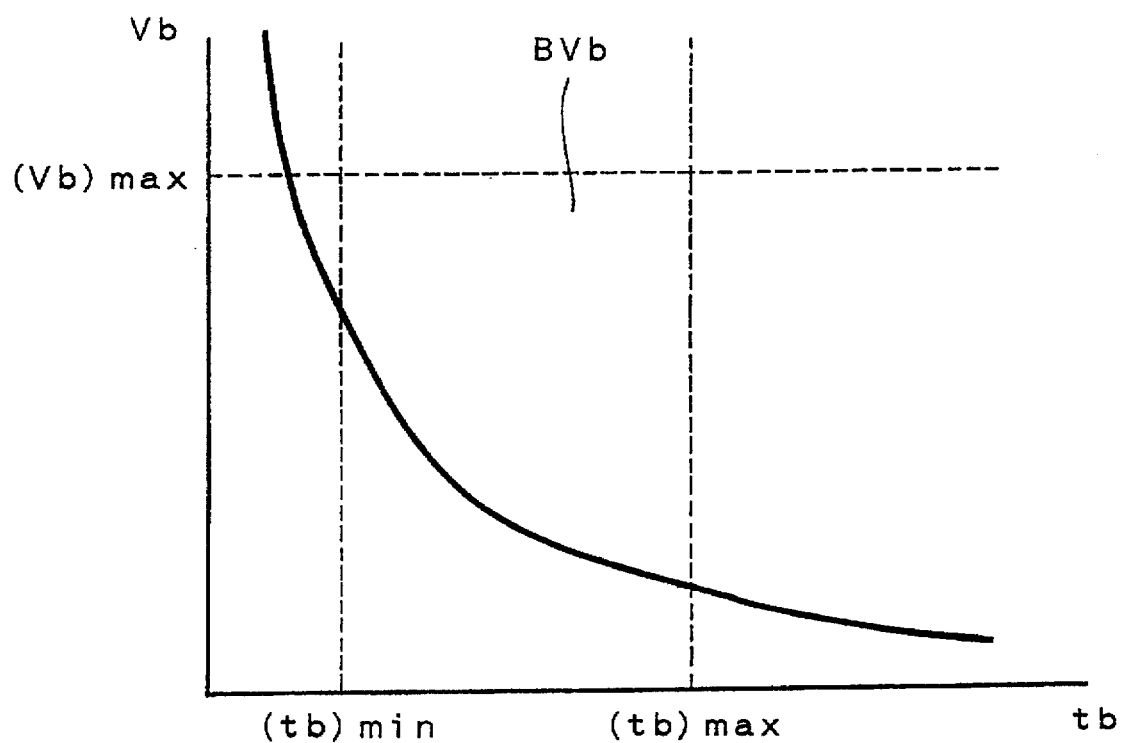
FIG. 9 is a graph showing the relationship between the wheel retracting speed during back-off grinding and the length of time of back-off grinding.

In step 302, the wheel head 13 is retracted at the wheel retracting speed vb calculated in step 245 of FIG. 8.

In step 303, the workpiece diameter dw is input from the in-process measuring device 24, and in step 304, the wheel position dx is input from the position detector 25.

In step 305, it is judged whether the wheel position dx input from the position detector 25 in step 304 reaches the target wheel position M(dx)b of back-off grinding calculated in step 252. When the wheel position dx input from the position detector 25 has reached the target wheel position M(dx)b, back-off grinding is ended, and the processing moves to step S4 of FIG. 5. When the wheel position dx has not reach the target wheel position M(dx)b, the processing moves back to step 302 so as to repeat the steps 302–305, thereby continuing the retracting movement of the wheel head 13. Thus, the back-off grinding processing of step S3 is completed.

Figure 14:
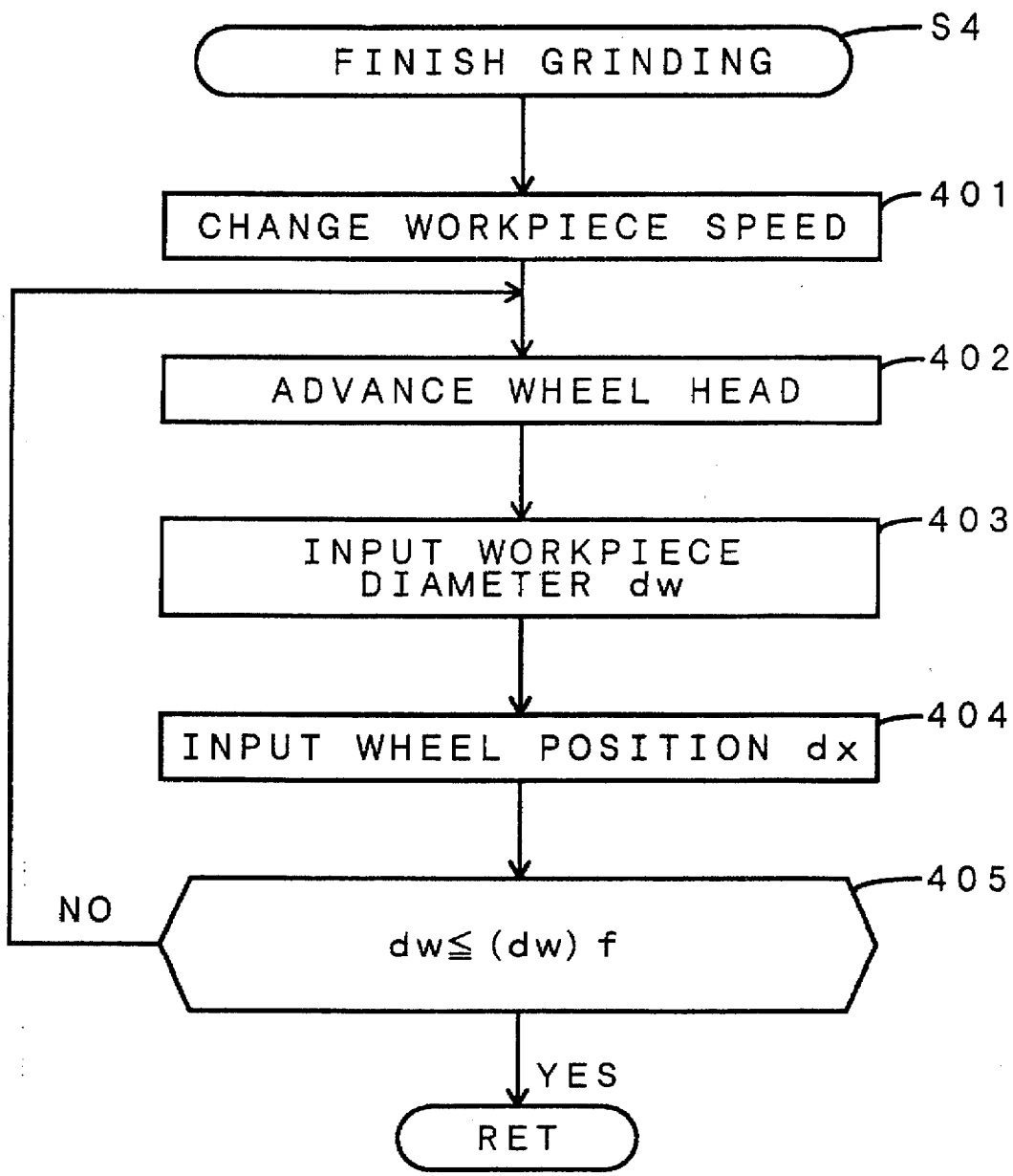
FIG. 14 is a sub-flowchart showing finish grinding processing.

When the processing moves to step S4 of FIG. 5, the finish grinding processing is performed. This finish grinding processing will be described with reference to the flowchart shown in FIG. 14.

In step 401, the rotational speed of the workpiece W is changed to the rotational speed (nw)f for the finish grinding. In step 402, the wheel head 13 is advanced at the infeed rate Vf set in step S1 of FIG. 5.

In step 403, the workpiece diameter dw is input from the in-process measuring device 24, and in step 404, the wheel position dx is input from the position detector 25.

In step 405, it is judged whether the workpiece diameter dw input from the in-process measuring device 24 in step 403 reaches the finish workpiece diameter (dw)f of the finish grinding. When the workpiece diameter dw has reached the finish workpiece diameter (dw)f, the finish grinding is ended, and the processing moves to step S5 of FIG. 5. When the workpiece diameter dw has not reached the finish workpiece diameter (dw)f, the processing moves back to step 402 so as to repeat the steps 402–405, thereby continuing the infeed of the wheel head 13. Thus, the finish grinding processing of step S4 is completed.

When the processing moves to step S5 of FIG. 5, the wheel head 13 is retracted at a rapid speed (continuous line RF in FIG. 6A), and the grinding operation is ended.

Figure 11:
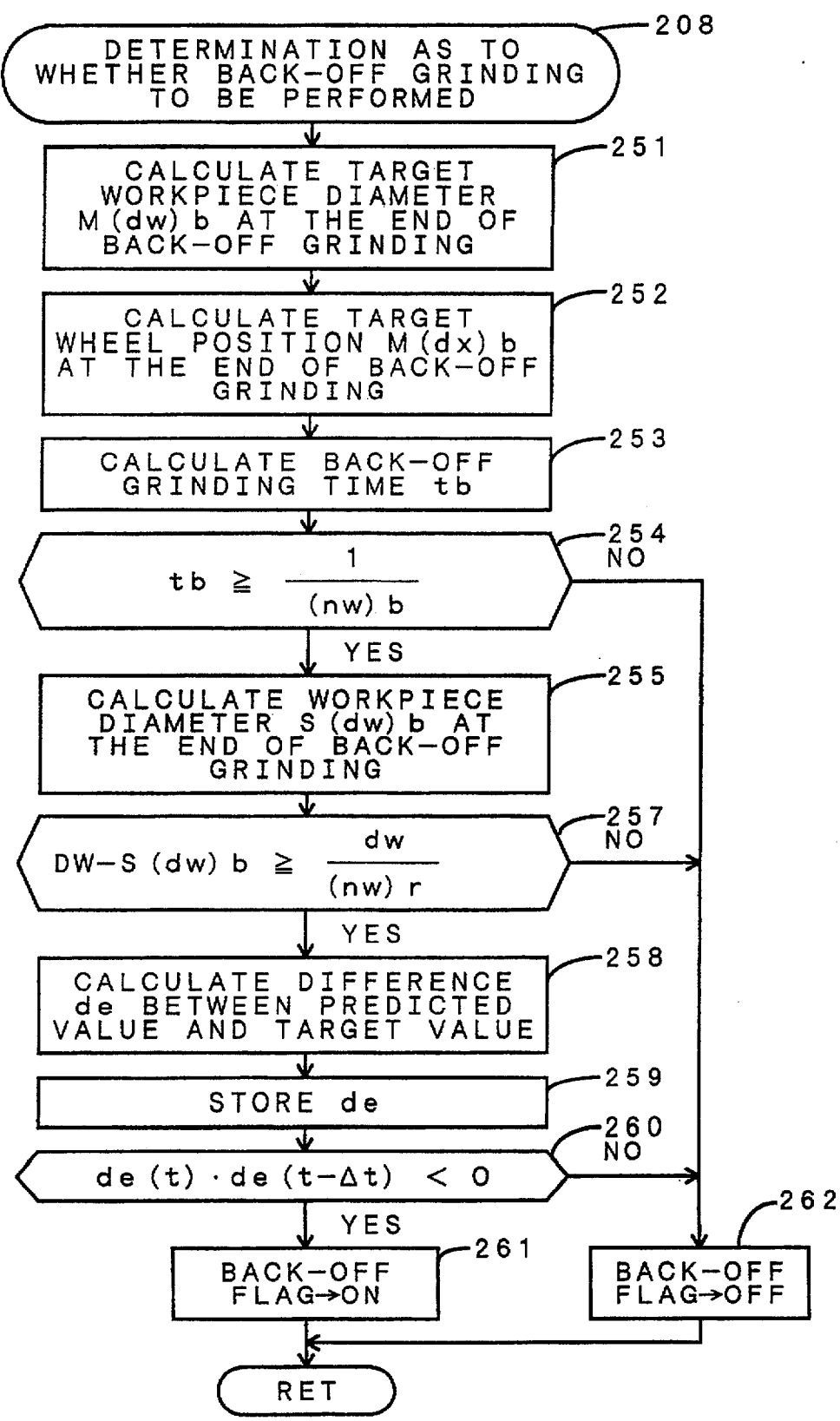
FIG. 11 is a sub-flowchart showing processing for judging whether back-off grinding is to be started.
Figure 12:
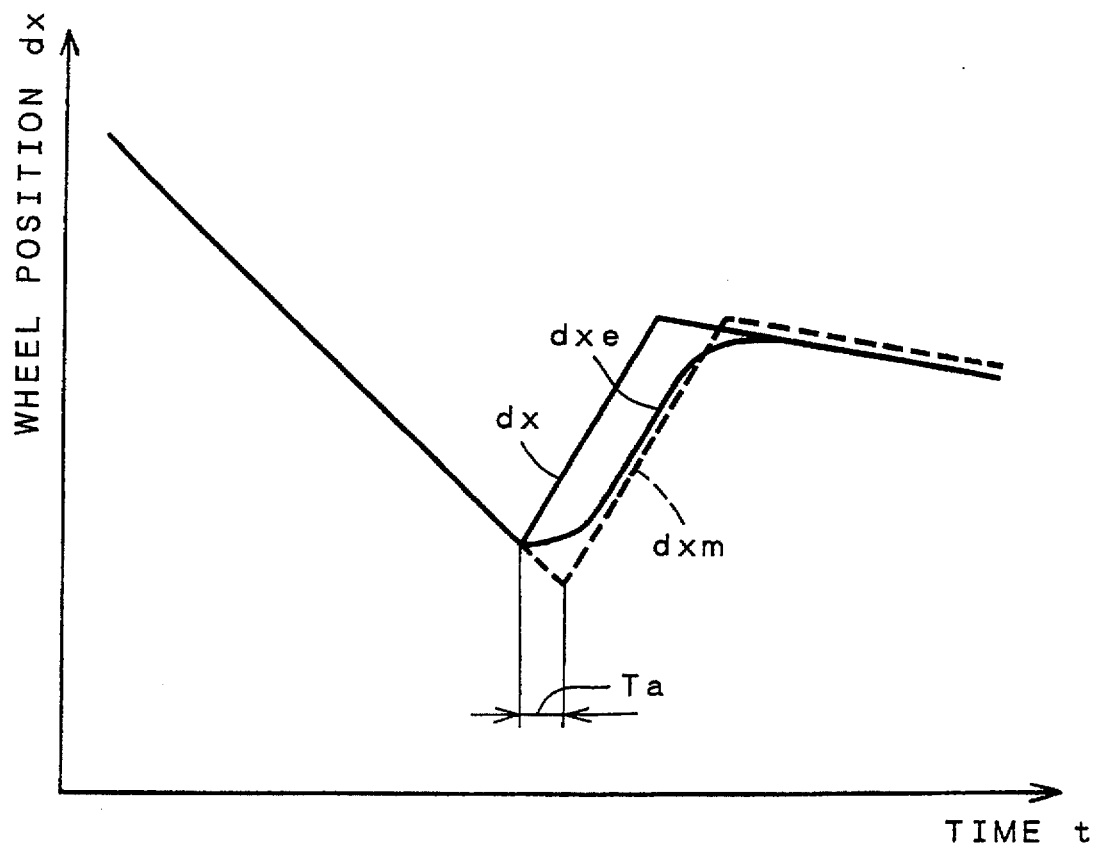
FIG. 12 is a graph showing a model for approximating the delay in the movement of the wheel head.
Figure 15:
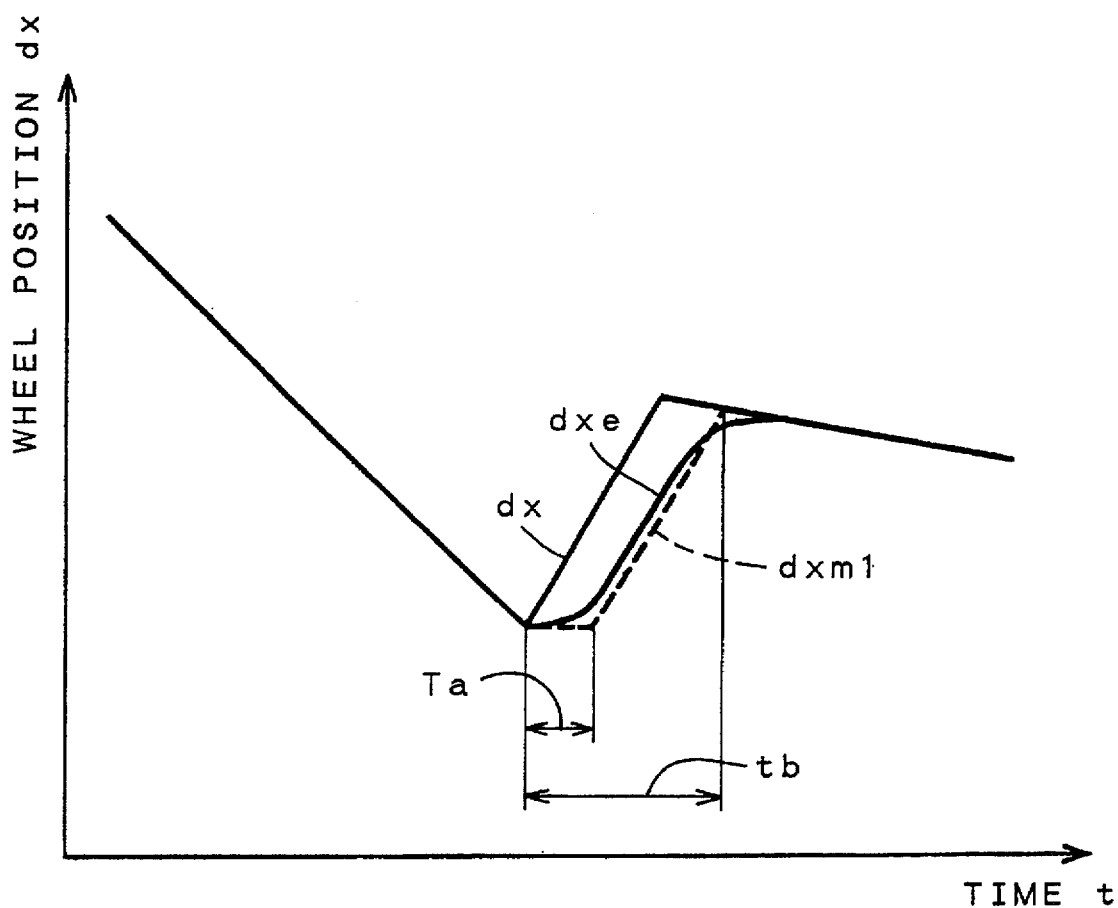
FIG. 15 is a graph showing another model for approximating the delay in the movement of the wheel head.

In the above-described embodiment, the calculation in step 255 of FIG. 11 for calculating the workpiece diameter S(dW)b at the end of back-off grinding utilizes a model in which the motion of the wheel head 13 is approximated by considering that the wheel head 13 moves with a delay Ta with respect to the commanded movement (thin continuous line dx) as shown in FIG. 12. However, it is possible to use a model in which the movement of the wheel head 13 is linearly approximated as indicated by a broken line dxm1 in FIG. 15. In this case, the workpiece diameter S(dw)b at the end of back-off grinding is calculated using the following equation instead of the equation (14):

$$S(dw)b = \left( DW \cdot \exp(C \cdot Ta) - \frac{Vb}{C} \right) \exp(C(tb - Ta)) + Vb(tb - Ta) + DX + \frac{Vb}{C} \quad (17)$$

Figure 16:
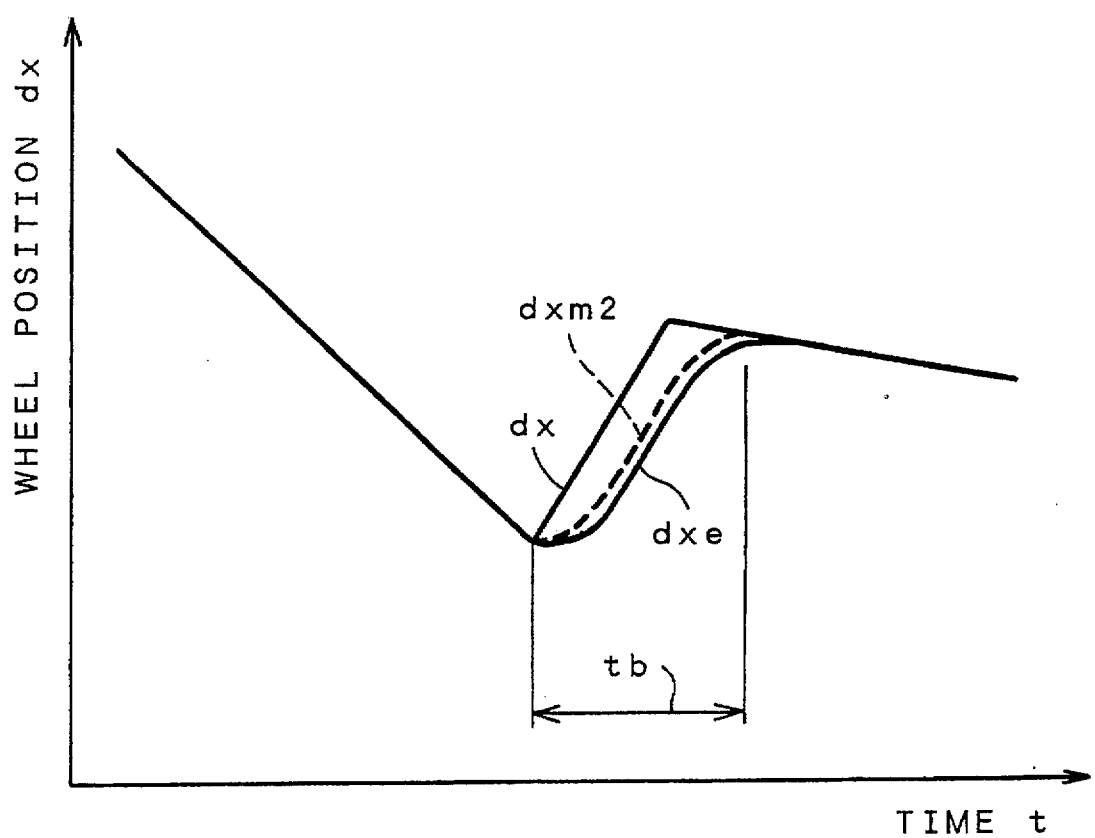
FIG. 16 is a graph showing still another model for approximating the delay in the movement of the wheel head.

Also, when the delay in the response of the servomotor 23 and the like is important and the feed system is therefore approximated as a first order lag system, the movement of the wheel head can be approximated as indicated by a broken line dxm2 in FIG. 16. In this case, the workpiece diameter S(dw)b at the end of back-off grinding is calculated using the following equation instead of the equation (14):

$$S(dw)b = R \cdot \exp(C \cdot tb) - \frac{C \cdot P \cdot \exp(K2 \cdot tb)}{(K2 - C)} - K1 \cdot Vb \cdot tb - \frac{K1 \cdot Vb}{C} - Q \quad (18)$$

wherein $$P = \frac{K1 \cdot Vb}{K2} + (K1 + 1) \cdot DX$$

$$Q = P - DX$$

$$R = \frac{DX + C \cdot P}{K2 - C} + \frac{K1 \cdot Vb}{C} + Q$$

wherein K1 and K2 are constants.

As described above, in the grinding machine according to the present embodiment, the processing in step 255 of FIG. 11 predicts the workpiece diameter S(dw)b which would be obtained at the end of back-off grinding if back-off grinding were started at each of a plurality of points of time during rough grinding GR, and the calculation for predicting the workpiece diameter S(dw)b is performed taking account of the follow-up delay of the control system and the mechanical delay of the wheel head 13. Therefore, it is possible to eliminate the difference between the predicted value S(dw)b of the workpiece diameter and the actual workpiece diameter (dw)b at the end of back-off grinding. Accordingly, back-off grinding can be started at an optimal timing.

In the above-described embodiment, the residual grinding amount dr is calculated as the difference between the workpiece diameter DW measured by the in-process measuring device 24 and the wheel position DX detected by the position detector 25. However, the present invention is not limited thereto, and load sensors may be so modified that they will be provided so as to detect loads acting on the centers 15a and 16a of the work spindle 15 and the tailstock 16, and an amount of deflection (residual grinding amount dr) is calculated on the basis of the loads detected by the load sensors. The amount of deflection (residual grinding amount dr) thus detected is used in the above-described various kinds of calculation.

Obviously, numerous modifications and variations of the present invention are possible in light of the above teachings. It is therefore to be understood that within the scope of the appended claims, the present invention may be practiced otherwise than as specifically described herein.

What is claimed is:

1. A method of grinding a workpiece in which a rotating workpiece and a rotating grinding wheel are relatively moved toward and away from each other and in which at least first and second grinding steps are performed at high and low infeed rates, respectively, and back-off grinding is performed between said first and second grinding steps, said method comprising the steps of:

providing a target workpiece diameter to be obtained at the end of said back-off grinding;

repeatedly predicting, during said first grinding step, a workpiece diameter which would be obtained at the end of said back-off grinding if said back-off grinding were started instantaneously, said workpiece diameter being predicted taking account of a delay in the movement of said grinding wheel;

judging whether the predicted workpiece diameter at the end of said back-off grinding is equal to the target workpiece diameter at the end of said back-off grinding; and starting said back-off grinding when it is judged that the predicted workpiece diameter at the end of said back-off grinding is equal to the target workpiece diameter at the end of said back-off grinding.

2. A method of grinding a workpiece according to claim 1, wherein said step of repeatedly predicting a workpiece diameter comprises the steps of:

providing a model which approximates delay in the movement of said grinding wheel;

obtaining an amount of reflection of said workpiece as a residual grinding amount; and predicting said workpiece diameter on the basis of the residual grinding amount and said model.

3. A method of grinding a workpiece according to claim 2, wherein said step of providing a target workpiece diameter comprises the step of calculating said target workpiece diameter based on a target finish diameter of said workpiece and grinding conditions for said second grinding step.

4. A method of grinding a workpiece according to claim 1, wherein said step of predicting a workpiece diameter comprises the steps of:

providing a model which approximates delay of said grinding wheel;

detecting the position of said grinding wheel;

measuring the diameter of said workpiece; and predicting said workpiece diameter on the basis of the detected position of said grinding wheel, the measured diameter of said workpiece, and said model.

5. A method of grinding a workpiece according to claim 4, wherein said step of repeatedly providing a target workpiece diameter comprises the step of calculating said target workpiece diameter based on a target finish diameter of said workpiece and grinding conditions for said second grinding step.

6. An apparatus for grinding a workpiece in which a rotating workpiece and a rotating grinding wheel are relatively moved toward and away from each other and in which at least first and second grinding steps are performed at high and low infeed rates, respectively, and back-off grinding is performed between said first and second grinding steps, said apparatus comprising:

means for providing a target workpiece diameter to be obtained at the end of said back-off grinding;

means for repeatedly predicting, during said first grinding step, a workpiece diameter which would be obtained at the end of said back-off grinding if said back-off grinding were started instantaneously, said workpiece diameter being predicted taking account of a delay in the movement of said grinding wheel;

means for judging whether the predicted workpiece diameter at the end of said back-off grinding is equal to the target workpiece diameter at the end of said back-off grinding; and means for starting said back-off grinding when it is judged that the predicted Workpiece diameter at the end of said back-off grinding is equal to the target workpiece diameter at the end of said back-off grinding.

7. An apparatus for grinding a workpiece according to claim 6, wherein said means for repeatedly predicting a workpiece diameter comprises:

a model which approximates delay of said grinding wheel;

means for obtaining an amount of reflection of said workpiece as a residual grinding amount; and means for predicting said workpiece diameter on the basis of the residual grinding amount and said model.

8. An apparatus for grinding a workpiece according to claim 7, wherein said means for providing a target workpiece diameter comprises means for calculating said target workpiece diameter based on a target finish diameter of said workpiece and grinding conditions for said second grinding step.

9. An apparatus for grinding a workpiece according to claim 8, wherein said apparatus further comprises mans for calculating, on the basis of said target workpiece diameter to be obtained at the end of said back-off grinding, a target position to be reached by said grinding wheel at the end of said back-off grinding, and said back-off grinding is performed by retracting said grinding wheel to the target position.

10. An apparatus for grinding a workpiece according to claim 6, wherein said means for repeatedly predicting a workpiece diameter comprises:

means for providing a model which approximates delay in the movement of said grinding wheel;

means for detecting the position of said grinding wheel;

means for measuring the diameter of said workpiece; and means for predicting said workpiece diameter on the basis of the detected position of said grinding wheel, the measured diameter of said workpiece, and said model.

11. An apparatus for grinding a workpiece according to claim 10, wherein said means for providing a target workpiece diameter comprises means for calculating said target workpiece diameter based on a target finish diameter of said workpiece and grinding conditions for said second grinding step.

12. An apparatus for grinding a workpiece according to claim 11, wherein said apparatus further comprises mans for calculating, on the basis of said target workpiece diameter to be obtained at the end of said back-off grinding, a target position to be reached by said grinding wheel at the end of said back-off grinding, and said back-off grinding is performed by retracting said grinding wheel to the target position.

\* \* \* \* \*